United States Patent
Hesse et al.

(10) Patent No.: US 7,089,066 B2
(45) Date of Patent: Aug. 8, 2006

(54) DISTRIBUTED CONTROL SYSTEMS AND METHODS

(75) Inventors: Scott Hesse, Longmont, CO (US); Gary Kiwimagi, Greeley, CO (US); Craig Ogawa, Loveland, CO (US)

(73) Assignee: Colorado vNet, LLC, Loveland, CO (US)

( * ) Notice: Subject to any disclaimer, the term of this patent is extended or adjusted under 35 U.S.C. 154(b) by 192 days.

(21) Appl. No.: 10/422,525

(22) Filed: Apr. 24, 2003

(65) Prior Publication Data

US 2004/0215778 A1    Oct. 28, 2004

(51) Int. Cl.
*G05B 19/18*    (2006.01)

(52) U.S. Cl. .............................. 700/2; 700/295; 700/79; 700/80; 700/53; 700/17; 700/65; 700/66; 165/254; 72/43; 29/38

(58) Field of Classification Search .................... 700/2, 700/276, 295, 65, 79, 80, 53, 17, 66; 714/47; 165/254; 72/43; 29/38
See application file for complete search history.

(56) References Cited

U.S. PATENT DOCUMENTS

| | | | |
|---|---|---|---|
| 5,278,977 A | 1/1994 | Spencer et al. | |
| 5,307,490 A | 4/1994 | Davidson et al. | |
| 5,664,101 A | 9/1997 | Picache | |
| 5,697,436 A * | 12/1997 | Johnson et al. | 165/254 |
| 5,956,515 A | 9/1999 | Beals et al. | |
| 6,047,311 A | 4/2000 | Ueno et al. | |
| 6,055,363 A | 4/2000 | Beals et al. | |
| 6,192,282 B1 | 2/2001 | Smith et al. | |
| 6,272,524 B1 | 8/2001 | Robinson | |
| 6,272,527 B1 | 8/2001 | Robinson | |
| 6,505,087 B1 | 1/2003 | Lucas et al. | |
| 6,792,337 B1 * | 9/2004 | Blackett et al. | 700/295 |
| 6,832,120 B1 * | 12/2004 | Frank et al. | 700/65 |
| 6,832,343 B1 * | 12/2004 | Rupp et al. | 714/47 |
| 6,868,292 B1 | 3/2005 | Ficco et al. | |
| 2002/0016639 A1 | 2/2002 | Smith et al. | |
| 2002/0035404 A1 | 3/2002 | Ficco et al. | |
| 2002/0111698 A1 | 8/2002 | Graziano et al. | |
| 2003/0065407 A1 | 4/2003 | Johnson et al. | |
| 2004/0215694 A1 | 10/2004 | Podolsky | |
| 2004/0260407 A1 | 12/2004 | Wimsatt | |

OTHER PUBLICATIONS

"I/Opener—Scripting Languages," Morin, R. and Brown, V., *SunExpert Magazine*, Sep. 1998, pp. 32, 34-35.

\* cited by examiner

*Primary Examiner*—Anthony Knight
*Assistant Examiner*—Sunray Chang
(74) *Attorney, Agent, or Firm*—Trenner Law Firm, LLC

(57) ABSTRACT

Distributed control systems and methods. An embodiment of distributed control system may comprise at least first and second nodes operatively associated with one another, the first node issuing a signal to at least the second node in response to an event. A load controlled by the second node, and a distributed controller provided at the second node. The distributed controller executing at least one script corresponding to the signal to control the load.

27 Claims, 4 Drawing Sheets

DISTRIBUTED CONTROL SYSTEMS AND METHODS

FIELD OF THE INVENTION

The invention generally pertains to control systems, and more specifically, to distributed control systems and methods.

BACKGROUND OF THE INVENTION

The ability to control one or more devices in a building (e.g., lighting, heating, air conditioning, security systems) based on one or more parameters (e.g., time, temperature, user preference) is known as building automation. Building automation may be implemented in any of a number of different types of buildings, including homes, offices, restaurants, stores, theaters, and hotels, to name only a few.

Building automation systems may be implemented using extensive computer networks. Computer networks are known in which a server computer issues a series of command strings over an Ethernet network to an output device. The command strings are complex data structures requiring the server computer to establish an elaborate communications protocol between the server computer and the output device, followed by the server transmitting multiple data packets containing the command strings.

Transmitting these command strings consumes significant bandwidth on the network, especially when more than one command string is issued to the same or multiple output devices at the same time or within a close timeframe. Network performance decreases, resulting in slow transmission speeds and sometimes even recognizable delays in response time. Transmitting command strings also increases the potential for data corruption resulting in failed operations. In addition, when the server computer fails, all of the devices on the network are "down."

SUMMARY OF THE INVENTION

An embodiment of distributed control system may comprise at least first and second nodes operatively associated with one another, the first node issuing a signal to at least the second node in response to an event. A load controlled by the second node, and a distributed controller provided at the second node. The distributed controller executing at least one script corresponding to the signal to control the load.

Another embodiment of distributed control system may comprise at least first and second nodes operatively associated with one another. A distributed controller provided at the first node, the distributed controller having: program code for executing at least one script to generate a signal in response to an event; and program code for issuing the signal corresponding to the event. A load operatively associated with the second node, the second node controlling the load in response to receiving the signal issued by the first node.

Methods for distributed control and stand-alone control systems are also disclosed.

BRIEF DESCRIPTION OF THE DRAWINGS

Illustrative and presently preferred embodiments of the invention are shown in the drawings, in which.

DESCRIPTION OF THE PREFERRED EMBODIMENT

Distributed control system 100 is shown and described herein as it may be used according to one embodiment of the invention in a building automation environment, although other uses are also contemplated as being within the scope of the invention. For example, distributed control system may be used in manufacturing, water supply monitoring, and a variety of other environments. Briefly, distributed control system 100 may be used to automate various functions (e.g., control one or more loads). Exemplary functions in a building automation environment may include lighting, climate control, audio/visual output, and various monitoring systems (e.g., security), to name only a few.

Figure 1:
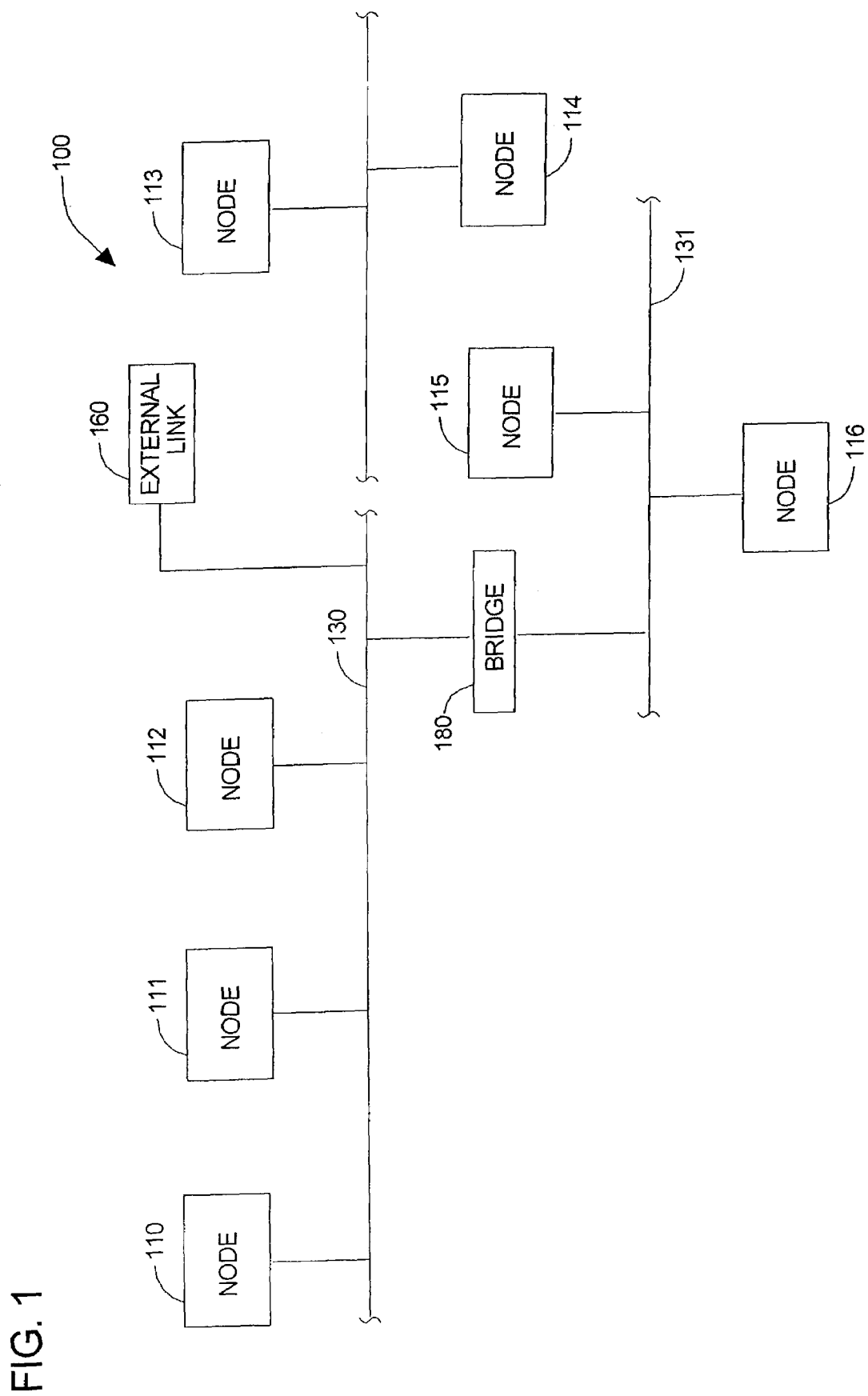
FIG. 1 is a high-level schematic diagram of one embodiment of a distributed control system.

An embodiment of distributed control system 100 is shown in FIG. 1 comprising a number of nodes 110–116 (generally referred to herein as 110) operatively associated with one another over network(s) 130, 131 (generally referred to herein as 130). Nodes 110 may comprise any of a wide variety of control and/or controlled devices now known or later developed. By way of example, in a building automation environment nodes 110 may comprise devices that respond to events (e.g., keypads, temperature sensors, timers, water-level sensors), devices that control various functions (e.g., lighting controls, motor controls), or a combination thereof.

Figure 2A:
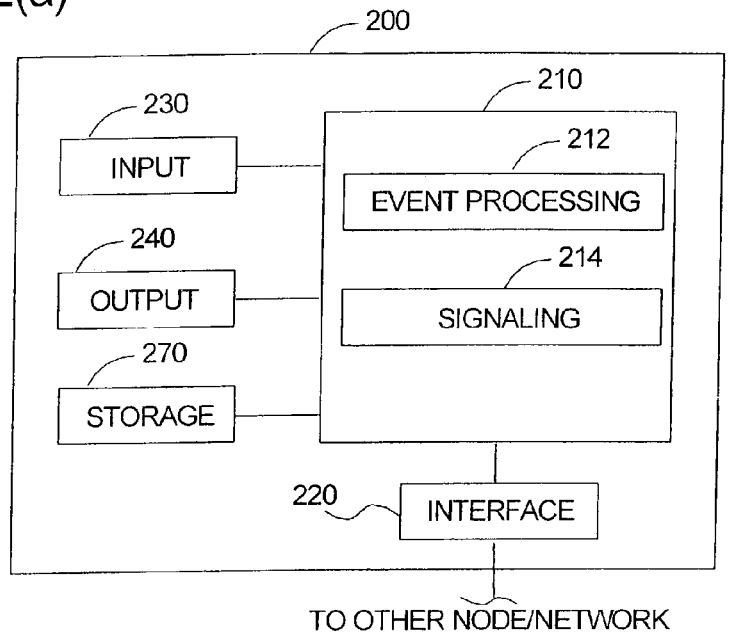
FIGS. 2(a) and (b) are high-level schematic diagrams showing embodiments of a node of distributed control system in more detail.

The nodes 110 may each be provided with a distributed controller 210, 211 and computer readable storage 270, 271 operatively associated therewith, as shown according to various embodiments of nodes 200, 250 in FIGS. 2(a) and (b), respectively. Preferably, at least one script (e.g., 400 in FIG. 4) is stored on the computer readable storage 270, 271 of at least one of the nodes. The script(s) can be executed in response to an event to perform a function (e.g., control a load).

In operation, one of the nodes 110 may respond to an event at least by issuing a signal 300 to one or more of the other nodes. In turn, the node receiving the signal 300 preferably performs one or more functions corresponding to the signal (e.g., controls a load based on the event). By way of example, when a user presses a key at a first node (e.g., 111), the first node 111 may issue a signal 300 associated with the event. The signal 300 may be received at a second node (e.g., 112), which in turn performs one or more functions corresponding to the signal 300 (e.g., adjusts the lighting intensity).

Figure 2B:
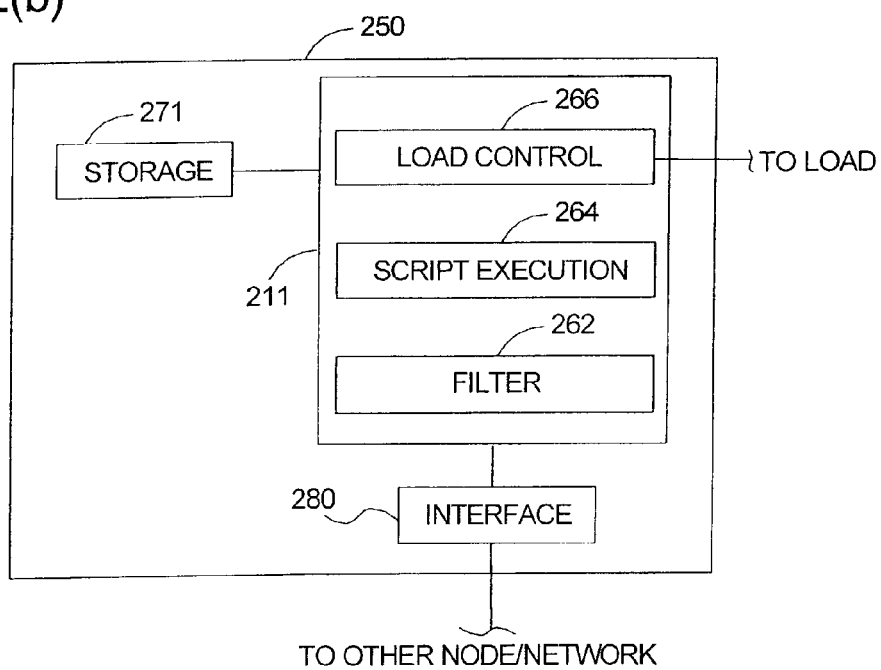

According to one embodiment, the node 110 responding to the event is an "unscripted" node (see e.g., FIG. 2(a)), and the node 110 receiving the signal is a "scripted" node (see e.g., FIG. 2(b)). For example, the first node 111 may respond to the event by issuing a signal 300 that identifies the event (e.g., "keypad button one pressed"). The second node 112 receives the signal identifying the event and executes at least one script provided at the second node 112 that corresponds to the signal 300 to perform one or more functions corresponding to the signal 300 (e.g., adjust lighting intensity).

It is to be expressly understood that the terms "scripted" and "unscripted" nodes as used herein are merely for the convenience of the reader. The term "scripted" node refers to a node that is provided with capabilities to execute scripts. As will be explained in more detail below, these nodes can be configured and reconfigured by adding, deleting, or modifying the scripts without having to modify the hardware or firmware. The term "unscripted" node refers to a node that is not provided with capabilities to execute scripts. These nodes may be provided with alternative capabilities, such as hard-coded instructions (e.g., firmware) to perform one or more predetermined functions.

According to another embodiment, the node 110 responding to the event is a "scripted" node, and the node 110 receiving the signal 300 is an "unscripted" node. For example, the first node 111 may respond to the event by executing at least one script provided at the first node 111 to generate a signal 300. The signal 300 comprises a control instruction. The second node 112 receives the signal 300 and performs one or more functions based on the control instruction.

According to yet another embodiment, both the node 110 responding to the event and the node 110 receiving the signal 300 are "scripted" nodes. For example, the first node 111 may respond to the event by executing at least one script provided at the first node 111 to generate a signal 300. Signal 300 identifies the event and may also comprise an address for delivery of the signal 300 on the network 130. Of course it is understood that the first node 111 may execute at least one script for performing any of a variety of other functions and is not limited to generating a signal 300 comprising an address. For example, the first node may execute at least one script to operate an LED light next to the key that was pressed, and the node may then issue a signal 300 similar to the signal issued by the "unscripted" node. In any event, the second node 112 receives the signal 300 and also executes at least one script provided at the second node 112 that corresponds to the signal 300 to perform one or more functions (e.g., adjust lighting intensity) corresponding to the signal 300.

In still another embodiment, nodes 110 may comprise a "stand-alone" node. According to such an embodiment, the stand-alone node responds to the event by executing at least one script provided at the stand-alone node to perform one or more functions without issuing a signal to the other nodes 110. By way of example, the stand-alone node may be implemented as a thermostat, wherein at least one script for turning the HVAC system on or off is executed in response to a clock indicating a predetermined time. Of course the stand-alone node is not limited to use as a thermostat and may be implemented in a wide variety of different types of devices. It will also be appreciated by those skilled in the art after having become familiar with the teachings of the invention that the stand-alone node can be readily modified from its stand-alone state for use on a network with other nodes.

It should be understood that the foregoing embodiments are provided in order to better understand exemplary embodiments of the invention. Of course the distributed control system 100 may comprise any of a wide range of other configurations, and various nodes 110 and functions beyond those used for lighting a room are also contemplated as being within the scope of the invention. The configuration of distributed control system 100 may depend in part on design considerations, which can be readily defined and implemented by one having ordinary skill in the art after having become familiar with the teachings of the invention.

Upon understanding the teachings of the invention, it becomes apparent that the distributed control system 100 is advantageous in many respects. For example, triggering execution of at least one script as opposed to transmitting complex data structures to control a load consumes less network bandwidth. Accordingly, the distributed control system 100 reduces network congestion, increases response time, and reduces the potential for data corruption, making the distributed control system 100 robust.

In addition, the distributed control system 100 does not require a host computer for operation, reducing the occurrence of a central failure. The distributed control system 100 also allows individual nodes 110 to be programmed and reprogrammed without affecting the other nodes 110 on the network 130. Further advantages include remote programming of the nodes 110. The distributed control system 100 may be modified for different and/or additional devices and functions at any time by the user (e.g., a service provider) even after the initial installation, allowing automated functions to be readily tailored for the user's preferences. Yet other advantages will also become apparent to one skilled in the art after having become familiar with the teachings of the invention.

Having briefly described distributed control system according to exemplary embodiments of the invention, as well as some of the features and advantages of the invention, embodiments of the invention will now be described in detail.

According to one embodiment of the invention, distributed control system 100 may comprise a number of nodes 110. In the embodiment shown in FIG. 1, the nodes 110 are operatively associated with one another over one or more networks 130, although it is understood that the invention also contemplates a "stand-alone" node.

Nodes 110 may be linked to one another over various types of networks. According to one embodiment, nodes 110 are linked using a controller area network (CAN) bus. Such an embodiment of building automation system 100 is described in more detail in co-pending, co-owned U.S. patent application Ser. No. 10/382,979, entitled "BUILDING AUTOMATION SYSTEM AND METHOD" of Hesse, et al., filed on Mar. 5, 2003, which is hereby incorporated herein by reference for all that it discloses.

Briefly, the CAN bus comprises a two-wire differential serial data bus. The CAN bus is capable of high-speed data transmission (about 1 Megabits per second (Mbits/s)) over a distance of about 40 meters (m), and can be extended to about 10,000 meters at transmission speeds of about 5 kilobits per second (kbits/s). It is also a robust bus and can be operated in noisy electrical environments while maintaining the integrity of the data.

The CAN specification is currently available as version 1.0 and 2.0 and is published by the International Standards Organization (ISO) as standards 11898 (high-speed) and 11519 (low-speed). The CAN specification defines communication services and protocols for the CAN bus, in particular, the physical layer and the data link layer for communication over the CAN bus. Bus arbitration and error management is also described. Of course the invention is not limited to any particular version and it is intended that other specifications for the CAN bus now known or later developed are also contemplated as being within the scope of the invention.

It is understood, however, that the present invention is not limited to use with the CAN bus and other types and/or configurations of networks are also contemplated as being within the scope of the invention. Other networks may also comprise an Ethernet or a wireless network (e.g., radio frequency (RF), BLUETOOTH™), to name only a few. In addition, the network 130 may comprise more than one network (e.g., 131), or subnets as they are sometimes referred to. In another embodiment, for example, the network may comprise a plurality of CAN bus subnets, each linked to one another by an Ethernet network. Bridging apparatus 180 may be provided to link the networks to one another.

It is also understood that nodes 110 may be operatively associated with the network 130 in any suitable manner, including by permanent, removable, or remote link. By way of example, nodes 110 may be permanently linked to the network 130 by a hard-wire connection. Alternativley, nodes 110 may be removably linked to the network by a "plug-type" connection. Nodes 110 may also be remotely linked to the network, for example via an RF link. Suitable interfaces may be provided for nodes 110 for issuing and receiving signals over the network 130. Such interfaces can be readily provided by one skilled in the art after having become familiar with the teachings of the present invention.

Before continuing, it should be noted that the distributed control system 100 may be provided with an optional link 160 (e.g., linked to the network 130 via an interface). In one embodiment, link 160 may comprise an external link from another network such as the Internet through an Internet service provider (ISP). In another embodiment, link 160 may comprise a link from another device on the same network (e.g., bridge 180 or server computer). Link 160 may be used to import/export the scripts 400 to the nodes 110 during installation or to configure or reconfigure one or more of the nodes 110 at a later time.

Of course, it is understood that the link 160 is not limited to an ISP link. In other embodiments, the link 160 may be via a local area network (LAN), a wide area network (WAN), an Intranet, a telephony link, a digital subscriber line (DSL), T-1 connection, cellular link, satellite link, etc. In addition, link 160 may connect to any suitable external device, such as to a laptop computer, personal digital assistant (PDA), pager, facsimile machine, or mobile phone, to name only a few. In addition, link 160 may comprise a temporary connection for use by a service technician or the user. For example, the link 160 may comprise a link for connecting a laptop computer to the network 130.

Nodes 110 may be any device or combination of devices generally configured to respond to an event. Nodes 110 may comprise, but are not limited to, keypads, knobs, sliders, touch-screens, graphical user interfaces (GUI), control systems (e.g., lighting control circuits, HVAC systems, security systems), personal computers (PC) and PC accessories, and other devices that are now known or later developed. In addition, nodes 110 may be operatively associated with, and receive input from external devices (e.g., clocks, water level sensors, temperature sensors, light sensors).

FIG. 2(*a*) shows one embodiment of an "unscripted" node 200 (e.g., a keypad). Unscripted node 200 may comprise a controller 210 operatively associated with the network 130 via network interface 220. controller 210 is preferably configured to respond to an event (e.g., receive input 230) by generating a signal 300 associated with the event (e.g., identifies the event). Controller 210 may be provided with computer-readable program code (e.g., firmware on computer readable storage 270). In one embodiment, computer-readable program code may comprise program code for processing an event 212 and program code for generating and/or issuing a signal 214. Accordingly, the controller 210 respond to an event (e.g., by receiving input and generating a signal corresponding to the event). Controller 210 may also generate output 240. For example, output 240 may comprise lighting an LED light (e.g., indicating a pressed key on a keypad, a status light, etc.).

It is noted that controllers such as provided for unscripted node 200 that can perform one or more predetermined functions are well-known in the electronics art and may comprise, by way of example, one or more programmable logic devices (PLDs) such as a field programmable gate array (FPGA), application-specific integrated circuit (ASIC), or microprocessor, to name only a few. It is also noted that network interfaces 220 are also readily available and the selection of a suitable network interface will depend to some extent on the type of network 130.

It is also well within the ability of one skilled in the art to provide computer-readable storage 270 for use with the present invention. Exemplary embodiments of computer-readable storage include, but are not limited to various types of programmable memory, read-only memory (ROM), random access memory (RAM), magnetic storage, a combination thereof, etc. Further explanation of computer-readable storage 270 is not necessary for a complete understanding of the invention, and therefore is not described in further detail herein.

Unscripted node 200 is preferably used with a "scripted" node. Scripted node 250 is shown according to one embodiment in FIG. 2(*b*) and may comprise a distributed controller 211 linked to the network 130 via network interface 280. Distributed controller 211 is also preferably operatively associated with computer-readable storage 271. Computer-readable storage 271 may be accessed before, during, or after installation (e.g., via link 160) to provide at least one script for use with the scripted node 250.

Distributed controller 211 is preferably also configured to respond to an event. For example, distributed controller 211 may respond to signal 300 or other input received over network 130. Distributed controller 211 may also generate output (e.g., issue a signal over network 130).

Distributed controller 211 preferably comprises computer-readable program code (e.g., residing on computer-readable storage 270) for responding to signal 300 or other input. In one embodiment, distributed controller 211 may comprise a signal filter 262, program code for executing scripts 264, and program code for controlling one or more loads 266.

Signal filter 262 may be provided to determine whether a signal 300 issued over the network 130 is intended for scripted node 250. For example, signal filter 262 may compare the event associated with the signal to a one or more types of events that the scripted node 250 responds to (e.g., as defined by the script header).

If the signal 300 is intended for scripted node 250, program code for executing the script may read the signal 300 and execute at least one script corresponding to the signal. Embodiments of scripts are described in more detail below. For now, it is enough to understand that the executed script(s) may perform a function, and preferably drives a load (e.g., turn on a lighting circuit).

An unscripted node 200 may receive input and issue signals associated with the input to another node. Likewise, a scripted node 250 may receive signals from other nodes and perform one or more functions (e.g., driving a load) corresponding to the signals as instructed by the executed script(s). However, it is understood that the nodes 110 are not limited only to these operations. For example, nodes 110 can be configured to receive input, issue signals and/or perform one or more functions (e.g., driving a load). Such a node, although not shown, may be readily provided by combining components from both embodiments shown in FIGS. 2(a) and (b) and described above.

It is also noted that nodes 110 may also be configured with other sources to receive input and/or send output, and are not limited to I/O operations only with other nodes 110. For example, nodes 110 may receive input directly from sensors or timers operatively associated with the nodes 110, and send output to displays, data logs, etc.

As will be readily appreciated by those skilled in the art, nodes 110 may be provided with various ancillary devices, for example, power supplies, electronic controls, inpuvout-put (I/O) devices, etc. Such ancillary devices are well-understood and therefore are not shown or described herein as further description is not needed for a full understanding of, or to practice the invention.

In operation, one or more of the nodes 110 respond to various events. The scope of the present invention is not limited to any particular type of event. By way of example, events may include, but are not limited to a user pressing a key on a keypad, a clock indicating the time, a light sensor indicating the level of outdoor light, a water level sensor indicating the water level in a body of water, a flow control sensor indicating the flow of water, to name only a few.

As briefly described above, an unscripted node 200 may respond to an event by issuing a signal 300 (e.g., over network 130) to a scripted node 250. For purposes of illustration, an unscripted keypad may issue one or more signals in response to the user pressing a key (or sequence of keys). However, it is understood that in other embodiments, a scripted node 250 may issue a signal 300 to an unscripted node 200, or a scripted node 250 may issue a signal 300 to another scripted node 250.

Figure 3:
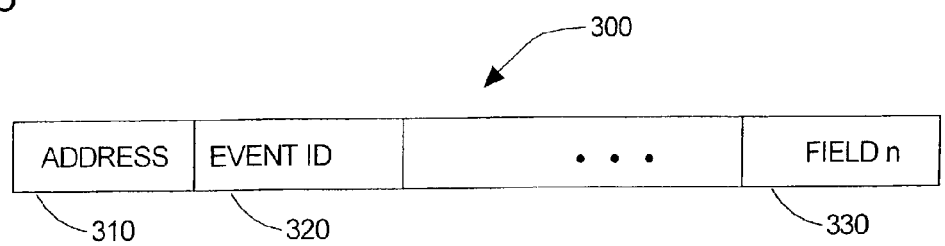
FIG. 3 is an illustration of one embodiment of a signal.

Signal 300 may comprise one or more fields 310–330, as shown according to one embodiment in FIG. 3. Preferably, at least one of the fields comprises an Event ID field 320 which comprises an event identifier. Signal 300 may also comprise other fields. For example, signal 300 may comprise an address field 310 with the network address of one or more of the nodes 110 so that the signal 300 can be delivered to one or more addressed nodes in the network 130.

In one embodiment, the node 110 generating signal 300 may issue redundant signals 300. A redundant signal 300 preferably is a copy of the signal 300, which may be issued over the network 130 sequentially, or at a later time (e.g., if the first signal is not received or is corrupted). Accordingly, if one of the signals 300 is misdirected, corrupted or otherwise unusable upon receipt by another device, the redundant signal is issued to the node 110. Redundant signal 300 may be issued automatically (e.g., following a time-out) or at the request of one or more of the nodes 110.

Other embodiments are also contemplated as being within the scope of the invention. As briefly mentioned above, signal 300 may be addressed to specific devices or categories of devices. Alternatively, signal 300 may be a global signal that is issued to all of the nodes 110 on the network 130 or one or more subnets 131. For example, signal 300 may be addressed to groups of nodes 110, such as all the outdoor lighting, so that all of the functions associated with those nodes 110 can be controlled without the need for issuing separate signals to each node 110.

The node(s) 110 receiving signal 300 may respond by executing at least one script to perform any one or more of a variety of functions. Script(s) 400 for performing various functions may be provided on the computer-readable storage 271 of a scripted node 250 and can be executed at the scripted node 250 by the distributed controller 211.

Executing the at least one script performs one or more functions, and preferably drives a load. For example, the executed script(s) may activate or deactivate a load, and preferably even control one or more parameters of the load (e.g., slew rate or intensity in the case of lighting). If the node 110 is a triac board, for example, the executed program code may turn on lighting (e.g., the load) to 50% intensity by slewing over 30 seconds.

It will be readily appreciated upon understanding the invention that the manner in which the load is controlled and/or the type of load that is controlled can be readily modified or altogether changed by modifying or replacing the script(s). By way of example, one or more of the buttons on a keypad can be defined to control one or more loads according to various parameters, and later the same buttons can be defined to control one or more different loads, and/or to control the same load in a different manner by modifying or replacing the scripts at the keypad and/or the node controlling the load. The functions of the nodes can be defined and/or redefined by the script(s), without having to modify the hardware itself.

The script(s) may be defined based on various parameters, such as the needs and desires of the building occupant. Although the script(s) may be generic (i.e., applicable to one or more predefined configurations), the script(s) are preferably custom or tailored for each use and is therefore defined once the configuration of a particular building automation system is known. As previously described, the script(s) can preferably also be reconfigured based on the changing needs and/or desires of the building occupants.

It is understood that the script(s) may be defined in any suitable manner. Scripts are computer-readable program code optimized for programmer efficiency (e.g., it is relatively easy to write, flexible, and readily modified). Scripts are preferably independent of the type of processor and/or operating system and are therefore portable to a variety of different environments. Among other advantages, scripts may also comprise predefined, high-level routines, such as string manipulation operators, regular expressions, and associative arrays.

Figure 4:
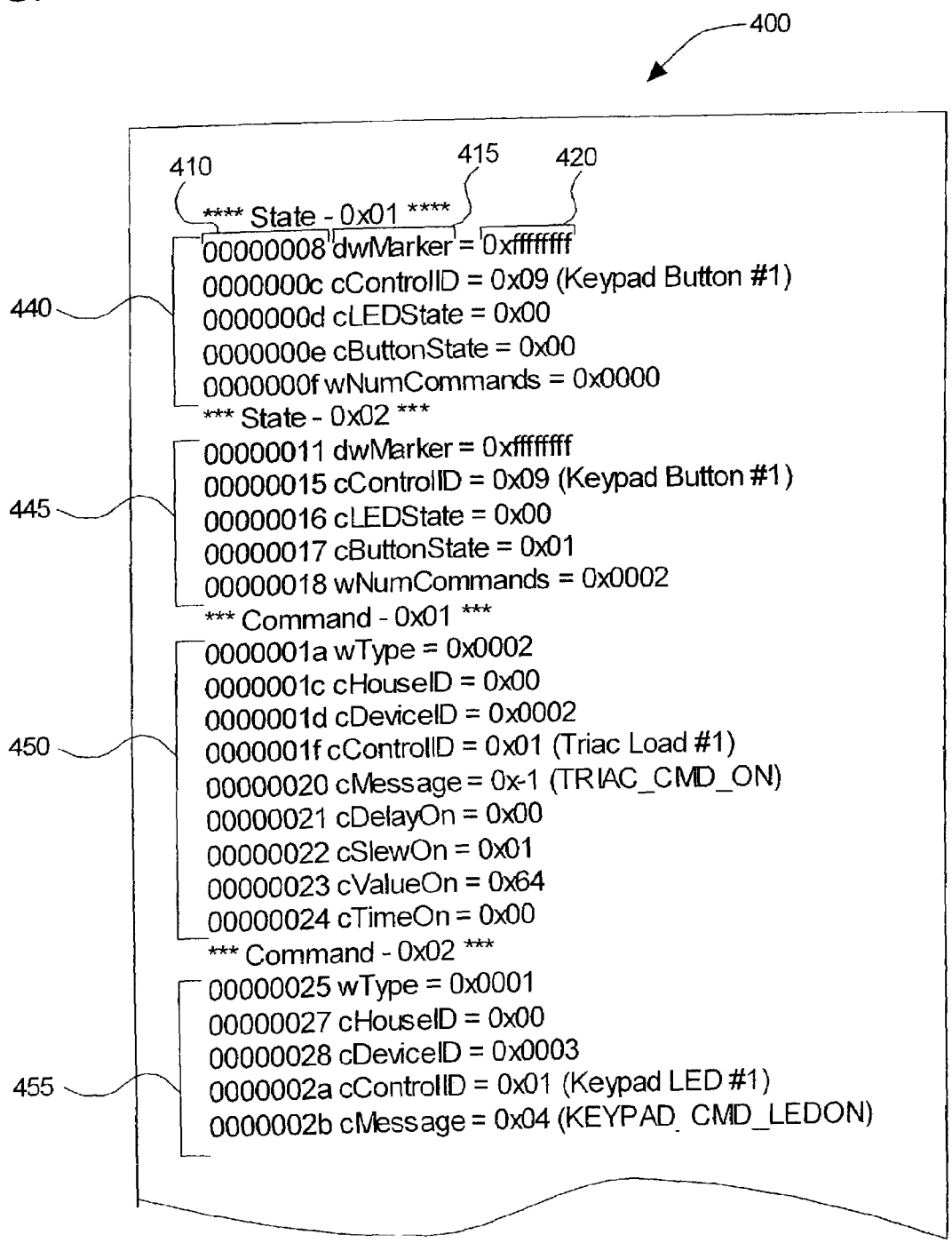
FIG. 4 is a portion of one embodiment of a script which may be used with the distributed control system of the present invention.

An exemplary embodiment of a script 400 is shown, in part, in FIG. 4 as it may be used according to the teachings of the present invention. It is understood, however, that the scripts are not limited to any particular format and the embodiment shown in FIG. 4 is merely exemplary for purposes of illustrating its use with the present invention.

The script 400 shown in FIG. 4 may reside at one or more of the scripted nodes 250. According to this embodiment, each line of script 400 comprises a hexadecimal address 410, a data type 415, and a configuration variable 420. In this embodiment, lines 440, 445 of the script 400 are headers which describe a first and second state of a keypad, respectively, and point to script commands. Lines 450 and 455 of script 400 describe script commands or command sets that the script headers 440, 445 point to, respectively.

It is understood that other exemplary embodiments of scripts may comprise compiled languages and assembly language which can be readily modified to change the functionality of the node 110 without having to modify the hardware itself.

According to preferred embodiments, the script(s) may be modified or replaced. Modifying or replacing the program code is particularly advantageous when one or more nodes 110 are added or removed from the building automation system 100, or where the user desires a change. For example, the script(s) may be modified where the user desires to change one or more parameters for node 110 (e.g., defining a new key, changing the lighting intensity or slew rate). For example, when the building changes occupancy, the script(s) may be readily changed to reflect needs and/or desires of the new occupants.

It is understood that node 110 may be provided with script(s) 400 at any time, and may be updated and/or modified at any time. For example, node 110 may be provided with script(s) 400 during manufacture, during installation, or at any time thereafter.

Distributed control system 100 may be operated according to embodiments of the invention, as follows. Node 110 may respond to an event by either executing at least one script to perform a function, or issuing a signal 300 to one or more of the other nodes. The nodes 110 may in turn perform a function corresponding to the signal 300. By way of example, when a user presses a key at a first node (e.g., 111), the first node 111 may issue a signal 300 associated with the event. The signal 300 may be received at a second node (e.g., 112), wherein the second node performs one or more functions (e.g., adjust lighting intensity) corresponding to the signal 300.

Figure 5:
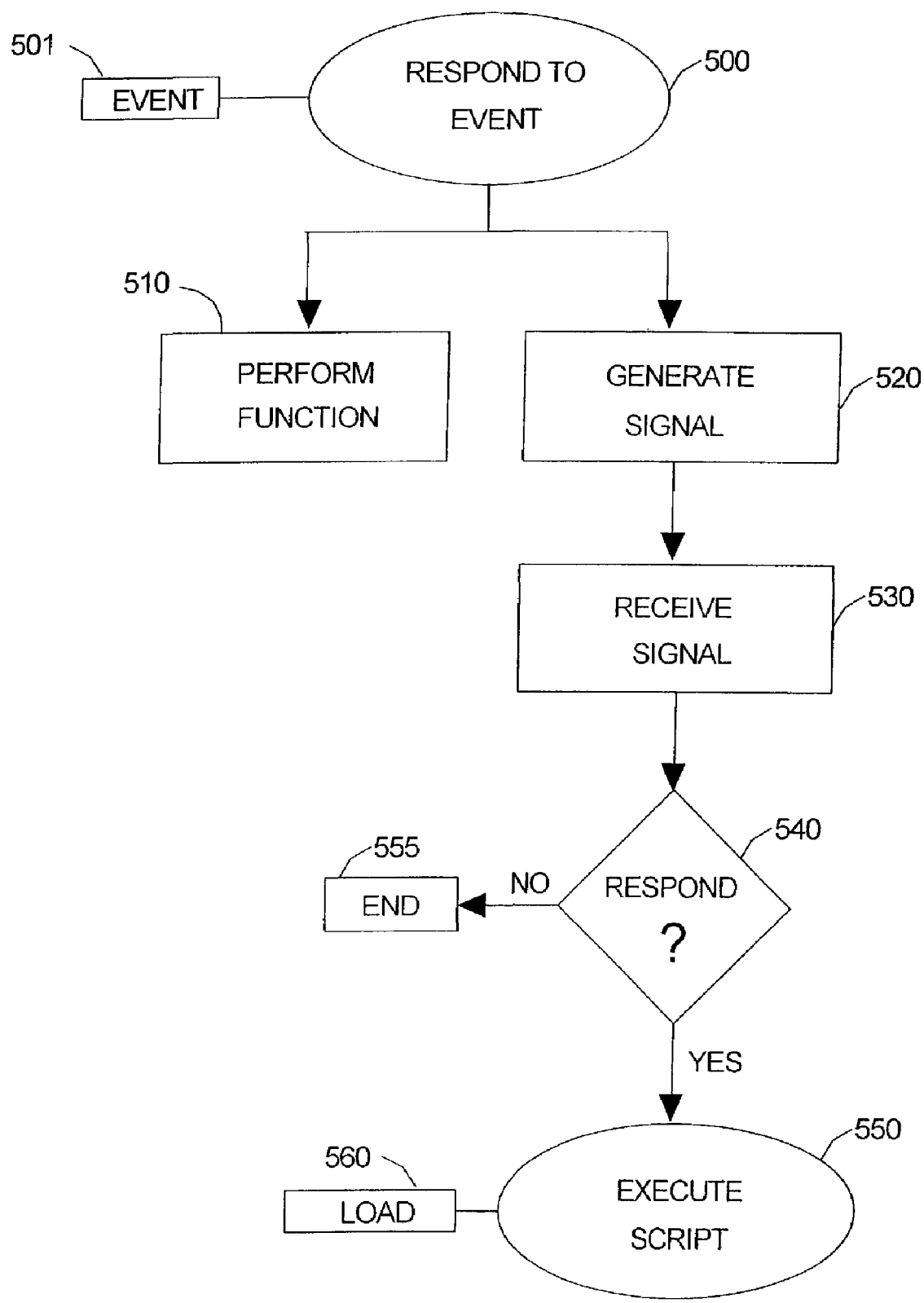
FIG. 5 is a process flow diagram illustrating steps of one embodiment of a method for distributed control according to the teachings of the invention.

With reference to FIG. 5, in step 500 node 110 may respond to an event 501 (e.g., a keypad button being pushed, output from a timer or sensor, etc.) by performing a function in step 510. For example, the node 110 may light an LED on the keypad. As another example, the node 110 may execute one or more scripts. Alternatively, or in addition to performing a function, node 110 may generate a signal 300 associated with the event in step 520. By way of example, node 110 may generate signal(s) that are representative of input received by the node 110 (e.g., the key(s) a user pressed). In another example, executing at least one script (e.g., in step 510) may generate signal(s) at node 110. In any event, the signal(s) 300 may be received by one or more of the other nodes 110 (or by itself, e.g., in a stand-alone embodiment), in step 530. Each node 110 receiving the signal determines whether it should respond to the signal 300 in step 540.

According to one embodiment, the signal(s) 300 are issued by broadcasting the signal(s) 300 over the network 130 to each of the other nodes 110. In this embodiment, step 540 may comprise signal filter 262 comparing the Event ID 320 of received signal 300 to events that the node 110 responds to. The node 110 responds in step 550 if the event(s) identified by the Event ID 320 are a type that the node 110 responds to. If the node 110 determines that it should not respond, it does nothing (i.e., the node "ignores" the signal) by ending in step 555.

In other embodiments, which are different from the previous embodiment wherein the signal is broadcast, the signal 300 may be addressed to one or more of the nodes 110. Accordingly, the signal filter 262 determines whether the node 110 should respond to the signal 300 based on the Address 310 of the signal 300. It is noted that in any embodiment, more than one node 110 may respond to the signal 300.

The node 110 responds to the signal 300 in step 550 by executing at least one script corresponding to the signal 300. According to preferred embodiments, executing the script(s) drives a load 560. In one example, the node 110 may comprise lighting controls (e.g., the load). Accordingly, executing the script(s) controls lighting on a lighting circuit.

Having generally described operation of the distributed control system 100 according to embodiments of the invention, the following example is provided to be illustrative of operation of the distributed control system 100 in one embodiment of the invention. In this example, a keypad is a scripted node 250, and a lighting control circuit is an unscripted node 200. With reference again to FIGS. 2(a) and (b), and FIG. 4, the keypad responds to a user pressing a key by executing the script 400 (FIG. 4), as follows. In this example, we will consider two states of one of the keys (i.e., State 01 and State 02).

In the first state (e.g., off), the keypad button is depressed and has a state cButtonState=0×00 (line 0000000e). No commands are logically associated with the first state in this example (line 0000000f). Accordingly, nothing happens.

In the second state (e.g., on), keypad button is released and has a state cButtonState=0×001 (line 00000017). Two commands are logically associated with the second state in this example (line 00000018). The first command is defined by lines 450. In this example, lines 450 define a load wType=0×0002 (e.g., a lighting control), and corresponding parameters, such as timer delay (line 00000021), slew rate (00000022), and so forth.

The second command is defined by lines 455. In this example, lines 455 define a load wType=0×0001 (e.g., an LED light next to the key that was pressed), and corresponding parameters such as activating the LED (line 0000002b).

Accordingly, program code for executing the script 400 may call program code for generating a signal 300 and issuing the signal 300 over the network. Signal 300 may comprise control instructions based on the executed script 400. Control instructions are preferably recognizable by the node 110 receiving the signal 300 to activate the lighting circuit as described by the script.

It is readily apparent from an understanding of the above example that script 400 may be readily modified for use by a scripted lighting control. According to such an embodiment, the scripted lighting control may receive a signal 300 (e.g., from a keypad). Signal filter 262 at the scripted lighting control may determine whether the scripted lighting control should respond to the signal 300 (e.g., if the Event ID corresponds to functions in headers 440, 445 of script 400). If the scripted lighting control should respond to the signal 300, distributed controller 211 executes commands defined by lines 450, 455 of script 400. Executing the script may call program code for activating the lights according to the executed script 400.

Of course it is understood that the above example is merely illustrative of one embodiment of the invention, and the scope of the invention is not intended to be limited to the above example. For example, the lighting control in the above example may be a scripted node 250. The distributed control system 100 of the present invention is also well-suited for performing more elaborate functions, now known or that may be later developed, as will be readily appreciated by one skilled in the art after having become familiar with the teachings of the present invention.

The following provides a brief overview of operation of the distributed control system 100 according to other embodiments contemplated as being within the scope of the invention. One such embodiment may comprise an unscripted node 200 responding to an event and a scripted node 250 receiving a signal 300 corresponding to the event from the unscripted node 200. In operation, the unscripted node 200 may respond to the event by issuing a signal 300 that identifies the event (e.g., "keypad button one pressed"). The scripted node 250 receives the signal 300 identifying the event and executes at least one script provided at the scripted node 250 that corresponds to the signal 300 to perform one or more functions corresponding to the signal 300 (e.g., adjust lighting intensity).

In another embodiment, a scripted node 250 may respond to the event, and an unscripted node 200 may receive the signal 300. In operation, the scripted node 250 may respond to the event by executing script(s) provided to generate a signal 300. The signal 300 comprises a control instruction. The unscripted node receives the signal 300 and performs one or more functions defined by the control instruction.

In yet another embodiment, each of the nodes may be scripted nodes 250. In operation, one or more of the scripted nodes 250 may respond to an event by executing script(s). For example, the first node may execute script(s) to activate an LED light next to the key that was pressed, and the scripted node 250 may also issue a signal 300. The one or more of the other scripted nodes 250 may receive the signal 300 and execute script(s) corresponding to the signal 300 to perform one or more functions (e.g., adjust lighting intensity) corresponding to the signal 300.

In still another embodiment, one or more of the nodes 110 may be "stand-alone" nodes. In operation, the stand-alone node responds to the event by executing script(s) provided at the stand-alone node to perform one or more functions without issuing a signal to the other nodes 110.

In yet other embodiments, a scripted node 250 may also function as an unscripted node 200. Accordingly, the distributed control system 100 can be configured with different types of nodes 110 or operating in different modes to operate according to the various embodiments described herein.

Of course distributed control system 100 may also comprise any combination of these embodiments. Further combinations will also be appreciated by those skilled in the art after having become familiar with the teachings of the present invention.

Distributed control system 100 may also be operated to provide acknowledgements. In one exemplary embodiment, the executed script(s) may generate a command signal and issue it to another of the nodes 110. For example, a lighting control node may issue a command signal to a keypad node instructing the keypad node to turn on an LED light or display a message on an LCD display at the keypad indicating to the user that the lighting is turned on.

In another exemplary embodiment, the acknowledgement field of signal 300 may comprise an acknowledgement or "ACK" message. Likewise, the acknowledgement field may be a negative acknowledged or "NAK" message when the received signal(s) cannot be read or are otherwise unusable. Other status signals may also be issued from one node 110 to another to indicate to the user and/or other devices the status of the node 110 issuing the status signal.

It is readily apparent that embodiments of the present invention represent an important development in the field of control systems. Having herein set forth preferred embodiments of the present invention, it is anticipated that modifications can be made thereto which will nonetheless remain within the scope of the present invention.

What is claimed is:

1. A distributed control system, comprising:
   a plurality of nodes including at least first and second nodes operatively associated with one another, the first node broadcasting a signal identifying an event to the other nodes without addressing any particular nodes, the signal only identifying the event to reduce network congestion;
   a signal filter provided at the second node, the signal filter used to determine, before the signal reaching the scripts, if at least one script residing at the second node would be activated based on the event identified in the signal from the first node by comparing an identification in the header of the scripts with the identification of the event;
   a distributed controller provided at the second node, said distributed controller executing the at least one script corresponding to the signal to control a building automation function if the second node is responsive to the signal from the first node.

2. The distributed control system of claim 1, further comprising a second distributed controller provided at the first node, said second distributed controller executing at least one script corresponding to the event to issue the signal.

3. The distributed control system of claim 1, wherein the first node comprises program code for processing an event and program code for issuing a signal in response to the event.

4. The distributed control system of claim 1, wherein said second node issues an acknowledgement.

5. The distributed control system of claim 1, wherein the first node is an unscripted node and the second node is a scripted node.

6. The distributed control system of claim 1, further comprising a Controller Area network (CAN) bus linking the at least first and second nodes to one another.

7. The distributed control system of claim 1, wherein the second node issues a command signal.

8. The distributed control system of claim 7, wherein the first node generates output in response to receiving said command signal.

9. The distributed control system of claim 1, further comprising a link operatively associated with the second node to remotely program the second node.

10. The distributed control system of claim 9, wherein said link is operable to at least modify the at least one script at the second node.

11. The distributed control system of claim 1, wherein the first node issues a redundant signal.

12. A distributed control system, comprising:
   a plurality of nodes including at least first and second nodes operatively associated with one another;
   a distributed controller provided at the first node, said distributed controller having:
      (a) program code for executing at least one script to generate a signal indentifying an event to reduce network congestion; and
      (b) program code for broadcasting the signal corresponding to the event to each of the plurality of nodes without addressing any particular nodes;
   the second node having a signal filter to determine, before the signal reaching the scripts, if at least one script residing at the second node would be activated by the identified event by comparing an identification in the header of the scripts with the event identified in the signal, the second node executing the corresponding script to control a building automation function in response to receiving the signal issued by the first node only if the second node is responsive to the event in the broadcast signal.

13. The distributed control system of claim 12, wherein the first node is a scripted node and the second node is an unscripted node.

14. The distributed control system of claim 12, further comprising a Controller Area network (CAN) bus linking said at least first and second nodes to one another.

15. The distributed control system of claim 12, wherein said second node issues an acknowledgement.

16. The distributed control system of claim 15, wherein said first node generates output in response to receiving said acknowledgement.

17. The distributed control system of claim 12, wherein said second node issues a command signal.

18. The distributed control system of claim 17, wherein said first node generates output in response to receiving said command signal.

19. The distributed control system of claim 12, further comprising a link operatively associated with at least said distributed controller to access the at least one script.

20. A method for distributed control in a building automation environment, comprising:
   broadcasting a signal from a first node to all other nodes in the building automation environment including at least a second node in response to an event in the building automation environment without addressing any particular nodes, the signal in only the event to reduce network congestion;
   if the second node includes a script corresponding to the signal at the second node as determined, before the signal reaching the scripts, by comparing an identification in the header of the scripts with the identification of the event, then executing the script corresponding to the signal at the second node and
   controlling a building automation function from lead at the second node based on the executed script corresponding to the signal issued from the first node.

21. The method of claim 20, further comprising generating the signal at the first node by executing a signal-generating script.

22. The method of claim 20, further comprising issuing an acknowledgement at the second node for the first node.

23. The method of claim 20, further comprising modifying the script at the second node.

24. A distributed control system for building automation, comprising:
   a plurality of nodes provided on a building automation network, each of the plurality of nodes controlling at least one building automation device;
   an input device provided on the building automation network, the input device generating a signal identifying only an event at the input device to reduce network congestion, and the input device broadcasting the signal to each of the plurality of nodes over the building automation network, the signal not addressed to any particular node in the building automation network; and
   a distributed controller provided at each of the plurality of nodes, the distributed controller having a signal filter for determining, be ore the signal reaching the scripts, if at least one script corresponds to the event identified by the signal by comparing an identification in the header of at least one script residing at the plurality of nodes with the identification of the event,
   if at least one script corresponds to the event identified by the signal, the
   distributed controller executing the at least one script to control the at least one building automation device, and
   if no script corresponds to the event identified by the signal, the distributed controller ignoring the signal.

25. The system of claim 24, wherein the signal only identifies the event and the script includes at least one function corresponding to the event.

26. The system of claim 24, wherein a function of the at least one building automation device is changed by modifying a script at the node without changing the event.

27. The system of claim 24, wherein a function of the at least one building automation device is changed by modifying a script at the node.

\* \* \* \* \*